(No Model.) 2 Sheets—Sheet 1.

T. LIEB.
SPRING SCALE FOR WEIGHING LIQUIDS.

No. 399,058. Patented Mar. 5, 1889.

WITNESSES
Carl Karr
Martin Petry

INVENTOR,
Theodor Lieb
BY
Goepel & Raegener
ATTORNEYS.

(No Model.)  2 Sheets—Sheet 2.

T. LIEB.
SPRING SCALE FOR WEIGHING LIQUIDS.

No. 399,058.  Patented Mar. 5, 1889.

WITNESSES:

INVENTOR

ATTORNEYS,

UNITED STATES PATENT OFFICE.

THEODORE LIEB, OF NEW YORK, N. Y.

SPRING-SCALE FOR WEIGHING LIQUIDS.

SPECIFICATION forming part of Letters Patent No. 399,058, dated March 5, 1889.

Application filed August 31, 1888. Serial No. 284,305. (No model.)

*To all whom it may concern:*

Be it known that I, THEODORE LIEB, of the city, county, and State of New York, have invented certain new and useful Improvements in Spring-Scales for Weighing Liquids, of which the following is a specification.

This invention relates to improved spring-scales for weighing liquids, said scales being specially designed with a view to sell beer and other malt liquors by weight, instead of by measure, as heretofore; and the invention consists of spring-scales which are suspended below the discharge-faucet of the liquid and provided with a platform for supporting the vessel, said platform depressing a fulcrumed scale-beam, which raises a sliding rack-bar against the tension of a spiral spring connected to said bar and to the supporting-frame of the scales. The rack-bar meshes with a pinion on a hollow arbor supported in bearings of the supporting-frame, a spindle passing through said arbor and carrying a loose index-hand that moves along a graduated scale. The spindle is acted upon by a spiral spring, so as to press the hand either against the hollow arbor or release it therefrom by means of a lever pivoted to said spindle, so that the weight of the vessel or the tare of the same is first ascertained and then the liquid filled into the vessel measured directly by reading off the required quantity on the scale.

Figure 1:
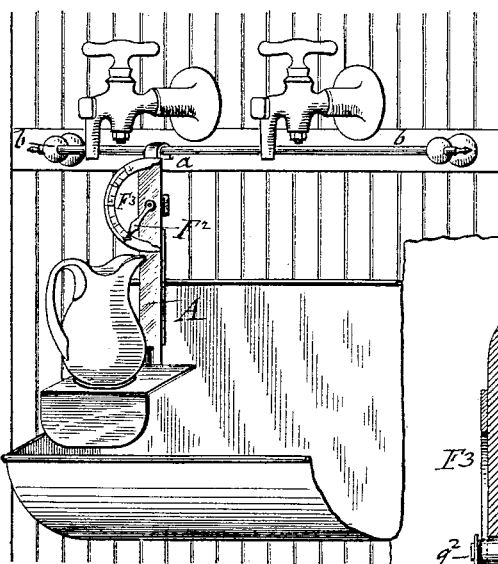
Figure 4:
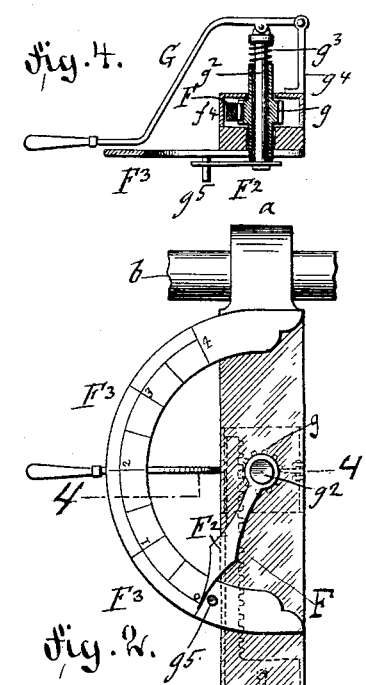
Figure 2:
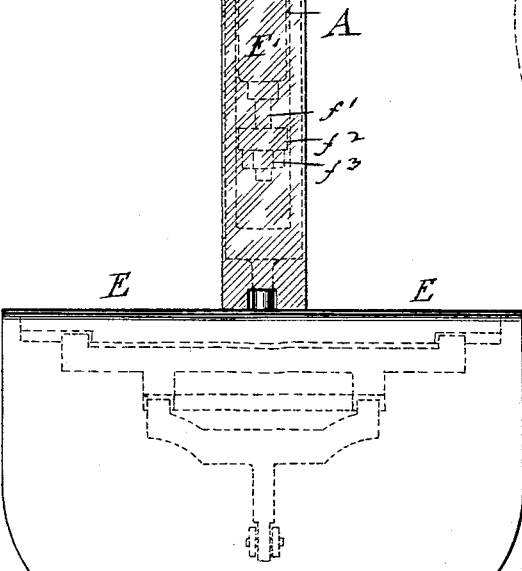
Figure 3:
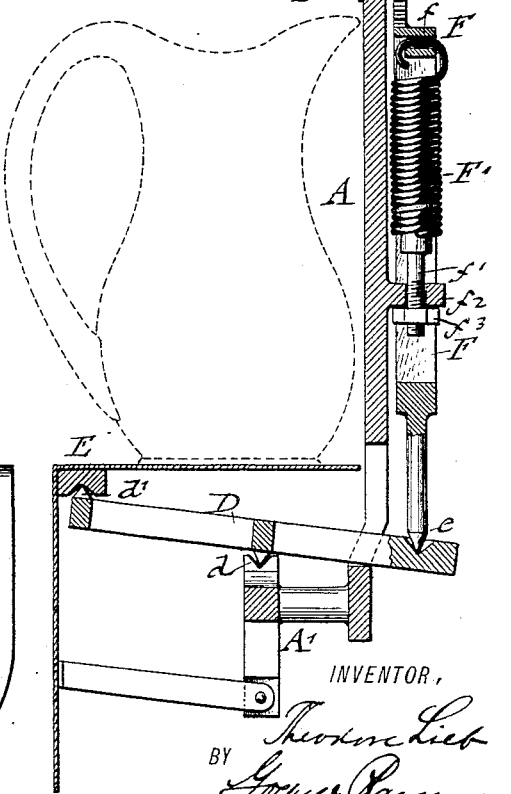
Figure 3:
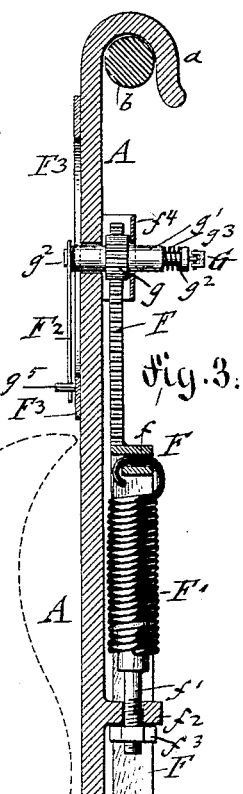
Figure 5:
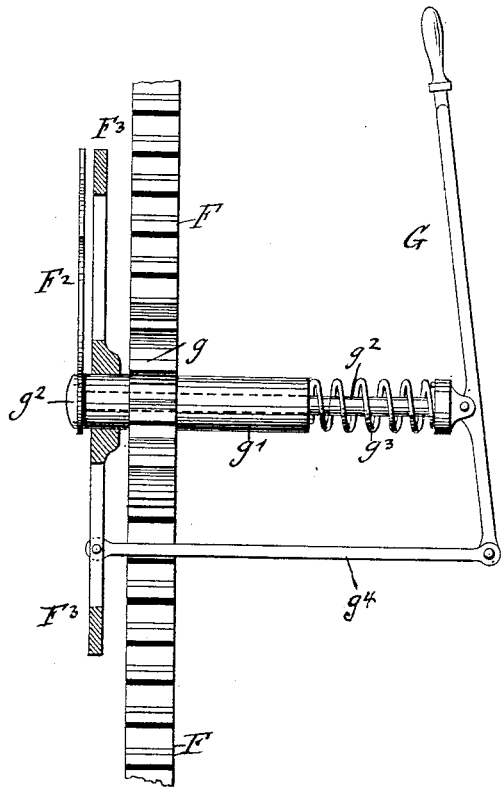
Figure 6:
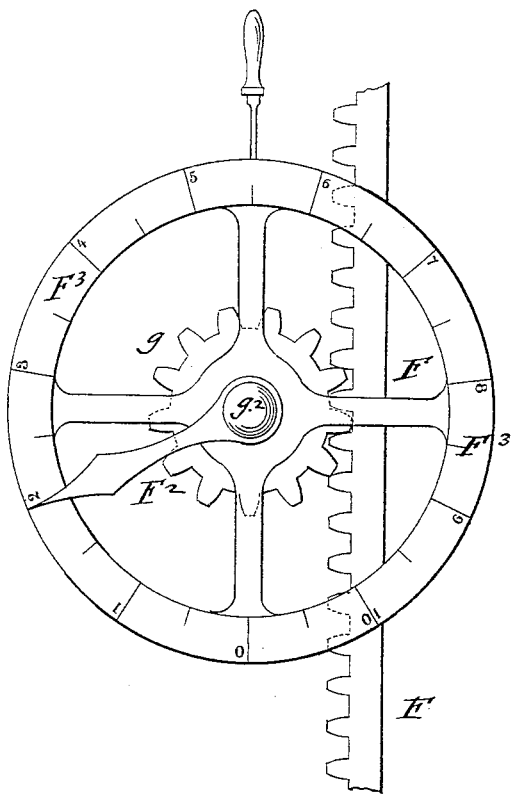

In the accompanying drawings, Figure 1 represents a perspective view of my improved spring-scales for weighing liquids, shown as suspended at the front of a refrigerator below one of the discharge-faucets of the kegs in the same. Fig. 2 is a front elevation of my improved spring-scales, drawn on a larger scale. Fig. 3 is a vertical transverse section of the same. Fig. 4 is a detail horizontal section on line 4 4, Fig. 2; and Figs. 5 and 6 are respectively a side view, partly in section, and a front view, of the index-hand and its actuating mechanism, drawn on a larger scale.

Similar letters of reference indicate corresponding parts.

Referring to the drawings, A represents the supporting-frame of my improved spring-scales, which frame is provided at the upper end with a hook, $a$, by which it is suspended from a bar, $b$, attached to the front of the refrigerator, or vertically below the discharge-faucet of a keg placed in the refrigerator. The lower end of the frame A is provided with a bracket-shaped offset, A′, which carries the knife-edged fulcrum $d$ of a scale-beam, D, the front end of which supports on a knife-edge, $d'$, the platform E, on which the vessel for the liquid is to be placed.

The rear end of the scale-beam D acts on the knife-edged lower end, $e$, of a vertically-guided and sliding rack-bar, F, the middle part of which is made in the shape of an open link and connected to a spiral spring, F′, that is attached at its upper end to an eye, $f$, of the rack-bar, and at the lower end by a screw-bolt, $f'$, that passes through a perforated lug, $f^2$, of the frame A, and is provided with a screw-nut, $f^3$, below said lug, so as to permit the tension of the spring to be properly adjusted, as shown in Fig. 3. The upper end of the rack-bar F is toothed and guided in a keeper, $f^4$, so as to mesh with a pinion, $g$, that is applied to a hollow arbor, $g'$, which turns in bearings at the upper part of the frame A. A spindle, $g^2$, passes through the hollow arbor $g'$, and carries at its headed front end a loose hand or index, F², which moves along a fixed graduated scale, F³, attached to the upper part of the frame A.

Between the enlarged rear end of the spindle $g^2$ and the hollow arbor $g$ is introduced a spiral spring, $g^3$, by which the hand or index F² is tightly pressed by the head of the spindle $g$ against the front edge of the hollow arbor $g'$, so as to retain the hand F² in position for following the motion of the hollow arbor $g'$ as imparted by the rack-bar. To the rear end of the spindle $g^2$ is pivoted a lever-handle, G, which is pivoted to a fixed arm, $g^4$, of the keeper $f^4$ or scale F³, as shown in Figs. 4 and 5, and extended back of the scale F³, so that when pressing the handle forward the spindle $g^2$ is moved forward, whereby the hand F is released and dropped back against a stop-pin, $g^5$, at the lower part of the scale F³, as shown in Fig. 2, or to the zero-mark of Fig. 6.

In place of making the hand movable and the scale F³ fixed, the scale may be made movable along a fixed index or pointer, the weight or tare of the vessel being set off in the same manner before letting the liquid run into the vessel.

My improved spring-scales are used as follows: The vessel into which liquid is to be weighed is placed on a platform, E, its weight being indicated by the hand $F^2$ on the scale $F^3$. The handle G is then pressed forward, so as to release the hand, which drops back to the stop-pin $g^5$ or to the zero-point at the lower part of the scale $F^3$. The liquid to be weighed is then transferred into the vessel by opening the discharge-faucet, until a pint or other determined quantity is filled into the same, which is indicated by the hand on the scale, the scale measuring thereby the net weight of the liquid in the vessel, as the weight or tare of the vessel has been set off before on the scale. The vessel is then removed and the index-hand transferred to the stop-pin or zero-point by pressing again on the handle G, so that the scale is then ready for weighing the next quantity of liquid, and so on. In this manner beer or other liquid can be sold in accurately-determined quantities in a quick and effective manner, which is more satisfactory than measuring it off, either by allowing the liquid to pass directly into the vessel or by measuring it first by means of a measuring-vessel and then transferring it to the vessel, which transfer is objectionable, as the beer or other liquid suffers by the transfer from one vessel to the other. The spring-scales permit the quick and accurate weighing of certain determined quantities of liquid and give to the customer the exact quantity to which he is entitled, whereby the sale of beer and other liquids is accomplished in a more satisfactory manner both to the dealer and customer.

Having thus described my invention, I claim as new and desire to secure by Letters Patent—

1. The combination, with a supporting-frame, of a fulcrumed scale-beam, a platform on said scale-beam, a rack-bar guided on the frame and resting on the scale-beam, a spiral spring connected to the rack-bar and frame, a hollow arbor provided with a pinion meshing with said rack-bar, a headed and spring-actuated spindle passing through the hollow arbor, a hand or index placed loosely on said spindle, a graduated scale on the supporting-frame, and a lever connected to the spindle and adapted to release the hand from the pressure of the spindle, so that it can drop back to the starting-point, substantially as set forth.

2. In a spring-scale, the combination, with a guided and spring-actuated rack-bar, of a hollow arbor having a pinion meshing with said rack-bar, a headed spindle passing through said hollow arbor, a loose hand at the front end of the spindle, a graduated scale, a spiral spring interposed between the rear end of the spindle and the hollow arbor, and a pivoted lever for pressing the spindle forward and releasing the hand, so that it drops back to the starting-point on the scale after having indicated the weight of the vessel and the contents of the same, substantially as set forth.

In testimony that I claim the foregoing as my invention I have signed my name in presence of two subscribing witnesses.

TH. LIEB.

Witnesses:
PAUL GOEPEL,
JOHN A. STRALEY.